United States Patent
Hasegawa et al.

(10) Patent No.: US 9,022,458 B2
(45) Date of Patent: May 5, 2015

(54) SIDE PANEL (71) Applicant: Honda Motor Co., Ltd., Tokyo (JP)

(72) Inventors: Kazuhide Hasegawa, Wako (JP);
Wakato Yamamoto, Wako (JP);
Katsutoshi Tada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/192,283

(22) Filed: Feb. 27, 2014

(65) Prior Publication Data
US 2014/0246881 A1    Sep. 4, 2014

(30) Foreign Application Priority Data
Mar. 1, 2013 (JP) ................... 2013-041150

(51) Int. Cl.
*B62D 25/04* (2006.01)
*B62D 29/04* (2006.01)

(52) U.S. Cl.
CPC .................................... *B62D 29/043* (2013.01)

(58) Field of Classification Search
CPC ............. B60R 19/565; B60R 2011/0029; B62D 25/02; B62D 25/2036; B62D 33/046; B62D 25/04; B62D 25/06

USPC .............. 296/191, 186.1, 181.3, 193.05, 203, 296/203.03, 203.01, 209, 187.08, 187.12

See application file for complete search history.

(56) References Cited

U.S. PATENT DOCUMENTS 5,150,944 A * 9/1992 Yoshida et al. .......... 296/203.01

FOREIGN PATENT DOCUMENTS

JP          06-278660          10/1994

* cited by examiner

*Primary Examiner* — Glenn Dayoan
*Assistant Examiner* — Dana Ivey
(74) *Attorney, Agent, or Firm* — Rankin, Hill & Clark LLP (57) ABSTRACT

A side panel for an automotive body includes a unitary panel having a side sill, a roof rail, and a pillar integrally joined to each other. The pillar extends from the side sill to the roof rail, and each of the side sill, the roof rail, and the pillar are made of fiber-reinforced plastic. At least one of the side sill, the roof rail, and the pillar has a recess concave transversely outwardly relative to the automotive body. The recess has an opening that opens transversely inwardly relative to the automotive body. The recess is defined by two side walls bent from flanges and extending transversely outwardly relative to the automotive body, and a bottom wall joined to the side walls. The side walls have portions joined to the flanges, the portions of the side walls being thicker than the bottom wall.

15 Claims, 7 Drawing Sheets

SIDE PANEL

CROSS-REFERENCE TO RELATED APPLICATION

This application is based upon and claims the benefit of priority from Japanese Patent Application No. 2013-041150 filed on Mar. 1, 2013, the contents of which are incorporated herein by reference.

BACKGROUND OF THE INVENTION

1. Field of the Invention

The present invention relates to a side panel for use as a side portion of an automotive body.

2. Description of the Related Art

Fiber-reinforced resins (Fiber-reinforced plastics) are a composite material that is produced by impregnating a resin such as a thermoplastic resin or the like with glass fibers or carbon fibers. In recent years, various attempts have been made to fabricate automobile body structural members of such composite resin materials.

For example, Japanese Laid-Open Patent Publication No. 06-278660 discloses a side body (side panel assembly), a roof rail, etc. that comprise a combination of an outer panel and an inner panel each made of a fiber-reinforced resin. The outer panel is a vehicle body member which faces outwardly, whereas the inner panel is a vehicle body member which faces inwardly. The outer panel and the inner panel are bonded together by an adhesive, making up a closed hollow side panel assembly with ribs disposed in an inner space defined in the side panel assembly.

SUMMARY OF THE INVENTION

For manufacturing the side panel assembly disclosed in Japanese Laid-Open Patent Publication No. 06-278660, it is essential to join the outer panel and the inner panel to each other by adhesive bonding. Since the side panel assembly is made up of a number of structural members, the side panel assembly cannot be assembled unless the structural members have been fabricated individually. For these reasons, it is not easy to improve the productivity of side panel assemblies.

It is also difficult to reduce the weight of side panel assemblies because each side panel assembly is made up of a number of structural members.

It may be proposed to construct a unitary side panel having an open cross-sectional shape, rather than a closed hollow side panel assembly, as a hollow body having an open end, i.e., an integral side panel body comprising a side sill, a roof rail, and a pillar extending from the side sill to the roof rail.

However, when a load is applied in directions to crush the vehicle body from the front and rear of the vehicle body, such a side panel body tends to be deformed, i.e., to buckle, in directions perpendicular to the directions in which the loads are applied.

It is a major object of the present invention to provide a side panel as a unitary single side panel having an open cross-sectional shape, which has a sufficiently high level of strength against buckling (buckling stress).

According to an embodiment of the present invention, there is provided a side panel for an automotive body, comprising a unitary panel having a side sill, a roof rail, and a pillar which are integrally joined to each other, the pillar extending from the side sill to the roof rail, each of the side sill, the roof rail, and the pillar being made of fiber-reinforced plastic, wherein at least one of the side sill, the roof rail, and the pillar has a recess that is concave transversely along a transversely outward direction with respect to the automotive body, the recess having an opening that opens along a transversely inward direction with respect to the automotive body, and flanges near the opening, the recess is defined by two side walls bent from the flanges, respectively, and extending along the transversely outward direction with respect to the automotive body, and a bottom wall joined to the two side walls, and the side walls have respective portions joined to the flanges, respectively, the respective portions of the side walls being thicker than the bottom wall.

The flanges are disposed in the vicinity of the opening of the recess, and the thicknesses of the two side walls and the bottom wall that define the recess are set such that the portions of the side walls that are joined to the flanges are thicker than the bottom wall. The side sill thus constructed has a large buckling stress and a large allowable bending moment. When a compressive load is applied to the side sill in directions to crush the automobile body along the longitudinal directions thereof, the side panel is less susceptible to buckling.

Of the side sill, the roof rail, and the pillar, the side sill is most liable to buckle. Therefore, the recess referred to above should preferably be defined in at least the side sill.

The side panel further includes a front fender bent from the side sill and contiguous to the side sill. Preferably, the recess should extend from the side sill into the front fender, and the side panel also should have a rib disposed in a bent region, which is the boundary between the side sill and the front fender, in the recess.

When a compressive load is applied through a front upper member, tires, etc. to an A pillar post, a force acts on the bent region between the side sill and the front fender, tending to bend the bent region and deforming the side walls and the flanges. However, the rib is effective to prevent the side walls and the flanges from being deformed, and to transmit the compressive load efficiently.

The side sill, the roof rail, and the pillar may be provided as separate individual members. These separate individual members are joined together to produce the unitary panel. Owing to the above structure, an apparatus for fabricating the side panel is thus made smaller in scale than if the side panel is originally fabricated as a unitary side panel.

The side panel may further include a rear fender disposed between the side sill and the roof rail and joined to the side sill and the roof rail.

The side sill and the front fender may be originally provided as a unitary member. In this case, the pillar may be joined to the side sill, and the roof rail may be joined to the front fender and the pillar.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A side panel according to a preferred embodiment of the present invention will be described in detail below with reference to the accompanying drawings.

Figure 1:
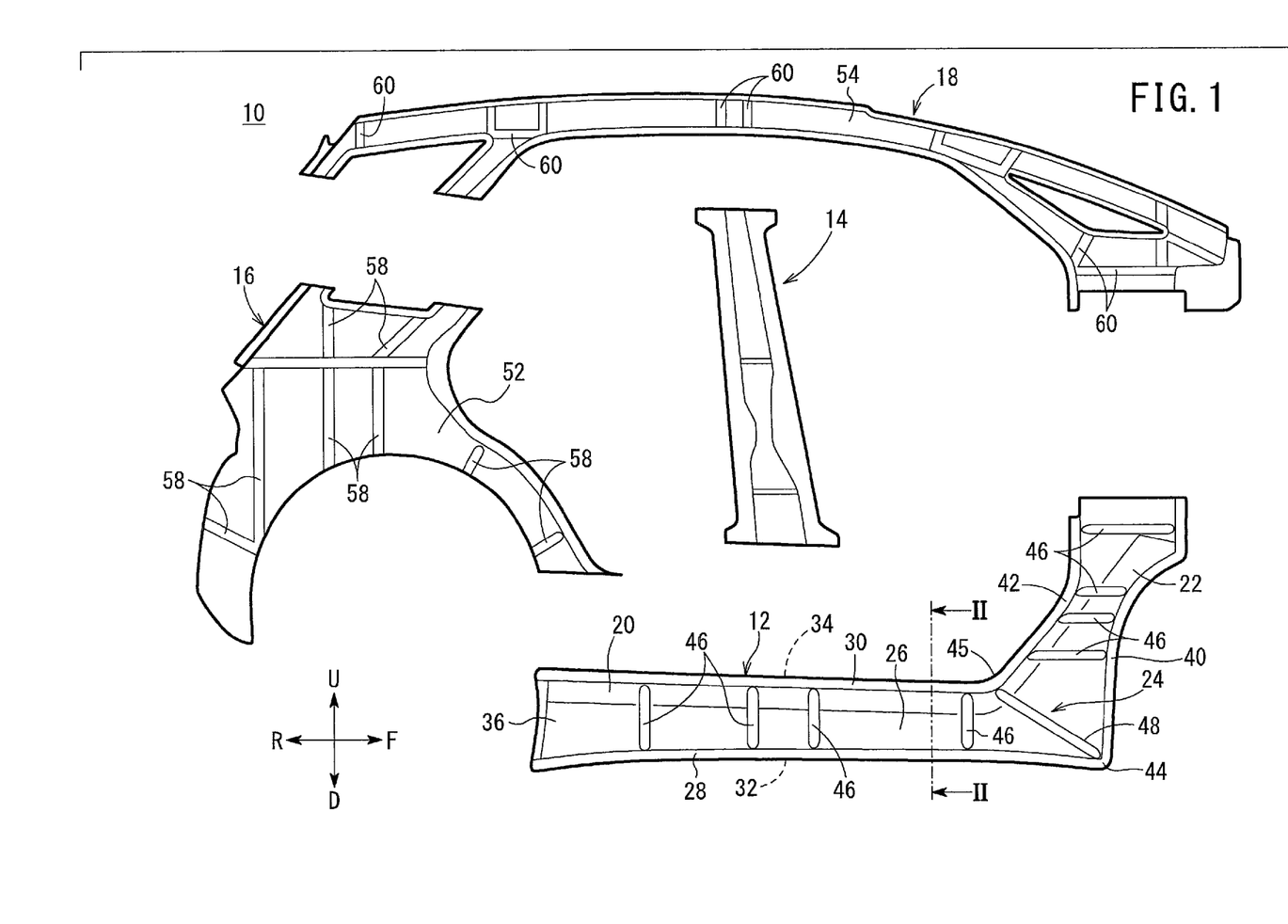
FIG. 1 is an exploded plan view of a side panel according to an embodiment of the present invention, the side panel being illustrated as being separated into structural members.
Figure 2:
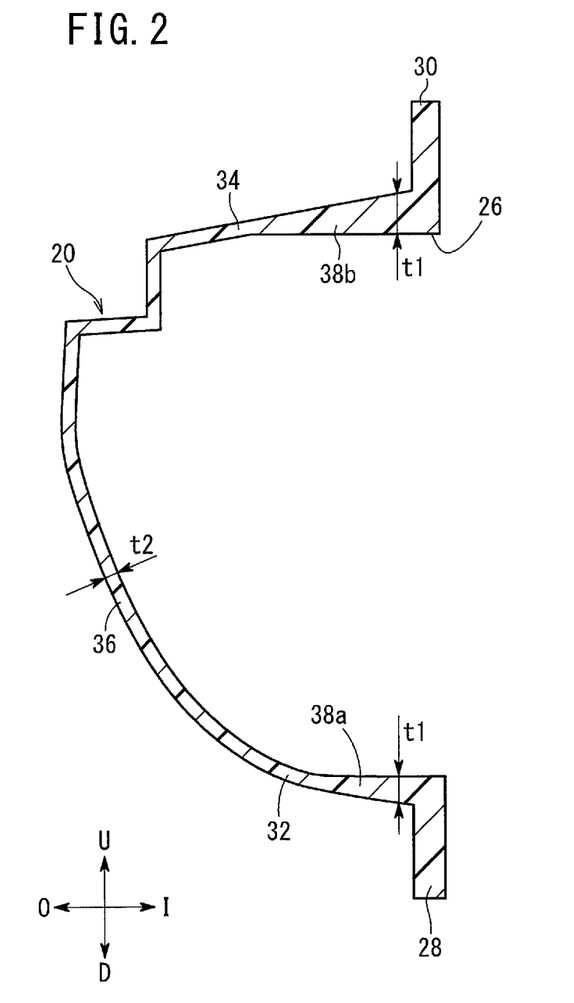
FIG. 2 is a cross-sectional view taken along line II-II of FIG. 1.

FIG. 1 is an exploded plan view of a side panel 10 according to an embodiment of the present invention, for use as a side portion of an automotive body, the side panel being illustrated as being separated into structural members. FIG. 2 is a cross-sectional view taken along line II-II of FIG. 1. In FIGS. 1 and 2, the arrows F, R, I, O, D, and U represent longitudinally forward, longitudinally rearward, transversely inward, transversely outward, vertically downward, and vertically upward directions, respectively, with respect to the automobile body.

The side panel 10 has a side sill member 12, a pillar member 14, a rear fender member 16, and a roof rail member 18. Each of these members 12, 14, 16, 18 of the side panel 10 is made of a fiber-reinforced resin (fiber-reinforced plastic) which comprises discontinuous fibers (chopped fibers) randomly dispersed in a thermoplastic resin as a base material. Though the discontinuous fibers may comprise glass fibers, they should preferably comprise carbon fibers for their excellent heat resistance, mechanical strength, and rigidity.

The side sill member 12 comprises a unitary member including a side sill 20 and a front fender 22 which are integrally contiguous to each other. The side sill 20 extends along the longitudinal directions of the automotive body, and the front fender 22 extends along the vertical directions of the automotive body. The boundary between the side sill 20 and the front fender 22 lies as a bent region 24 that is bent at an obtuse angle formed between the side sill 20 and the front fender 22.

The side sill member 12 has a recess 26 that extends from the side sill 20 into the front fender 22 and that is concave transversely along the transversely outward direction indicated by the arrow O and is open in the transversely inward direction indicated by the arrow I. The recess 26 lies as concave in a portion of the side sill 20 along the vertical directions of the automotive body, and the recess 26 also lies concave in a portion of the front fender 22 along the longitudinal directions of the automotive body. As shown in FIG. 2, the side sill 20 has a first vertical flange 28 and a second vertical flange 30 in the vicinity of an opening of the recess 26 in the side sill 20. The first vertical flange 28 extends substantially vertically downwardly from a lower edge of the opening of the recess 26, and the second vertical flange 30 extends substantially vertically upwardly from an upper edge of the opening of the recess 26.

The recess 26 is defined by a lower side wall 32 of the side sill 20 which is bent substantially perpendicularly from the first vertical flange 28 and extends transversely outwardly of the automotive body, an upper side wall 34 of the side sill 20 which is bent substantially perpendicularly from the second vertical flange 30 and extends transversely outwardly of the automotive body, and a bottom wall 36 joined to the lower side wall 32 and the upper side wall 34.

The lower side wall 32 has a proximal end portion joined to the first vertical flange 28, and the upper side wall 34 has a proximal end portion joined to the second vertical flange 30. These proximal end portions of the lower and upper side walls 32, 34 have the same thickness. The proximal end portions will be hereinafter referred to as "thick wall portions" and denoted by 38a, 38b, respectively. The thickness of the thick wall portions 38a, 38b is represented by t1.

The bottom wall 36 has a substantially constant thickness t2. The thickness t2 and the thickness t1 are related to each other by t1>t2. In other words, the thickness of the thick wall portions 38a, 38b is greater than the thickness of the bottom wall 36.

The front fender 22 has a front flange 40 and a rear flange 42 in the vicinity of an opening of the recess 26 in the front fender 22. The front flange 40 extends forwardly from a front edge of the opening of the recess 26, and the rear flange 42 extends rearwardly from a rear edge of the opening of the recess 26. The first vertical flange 28 and the front flange 40 are joined to each other by a bent corner 44 that is bent at a substantially right angle. The second vertical flange 30 and the rear flange 42 are joined to each other by a curved region 45 that is curved gradually.

The side sill member 12 also has a plurality of ribs 46 disposed in the recess 26. In the recess 26 in the side sill 20, the ribs 46 extend from the first vertical flange 28 to the second vertical flange 30. In the recess 26 in the front fender 22, the ribs 46 extend from the front flange 40 to the rear flange 42.

Another rib is disposed in the boundary between the side sill 20 and the front fender 22. The rib extends from the boundary between the first vertical flange 28 and the front flange 40 to the boundary between the second vertical flange 30 and the rear flange 42. To distinguish from the ribs 46, the rib disposed in the boundary between the side sill 20 and the front fender 22 will be hereinafter referred to as "boundary rib" and denoted by 48.

The rear fender member 16 and the roof rail member 18 also have respective recesses 52, 54 that are concave transversely along the transversely outward direction. The rear fender member 16 and the roof rail member 18 also have flanges in the vicinity of openings of the recesses 52, 54. The recesses 52, 54 are defined by side walls which may include thick wall portions joined to the flanges.

The rear fender member 16 and the roof rail member 18 also have ribs 58, 60 disposed in the recesses 52, 54.

The side panel 10 according to the present embodiment is basically constructed as described above. Operation and advantages of the side panel 10 will be described below.

The side panel 10 according to the present embodiment is of an open cross-sectional shape and is constructed without joining an outer panel and an inner panel together. Therefore, it is not necessary to join an outer panel and an inner panel to produce the side panel 10. This, in addition to the fact that the number of structural members of the side panel 10 is relatively small, makes it possible to improve the productivity of the side panel 10. Furthermore, reduction in weight of the side panel 10 is achieved easily.

The side panel 10 is combined with a front floor panel and a dash panel, both not shown, in making up an assembly. A chassis and doors are then installed on the assembly to produce an automotive body.

When a load (compressive load) is applied to an automobile having such an automotive body in directions to crush the automotive body along its longitudinal directions, the side panel 10 is effective to prevent the side sill 20 from buckling. The reasons therefor will be described below.

Figure 3:
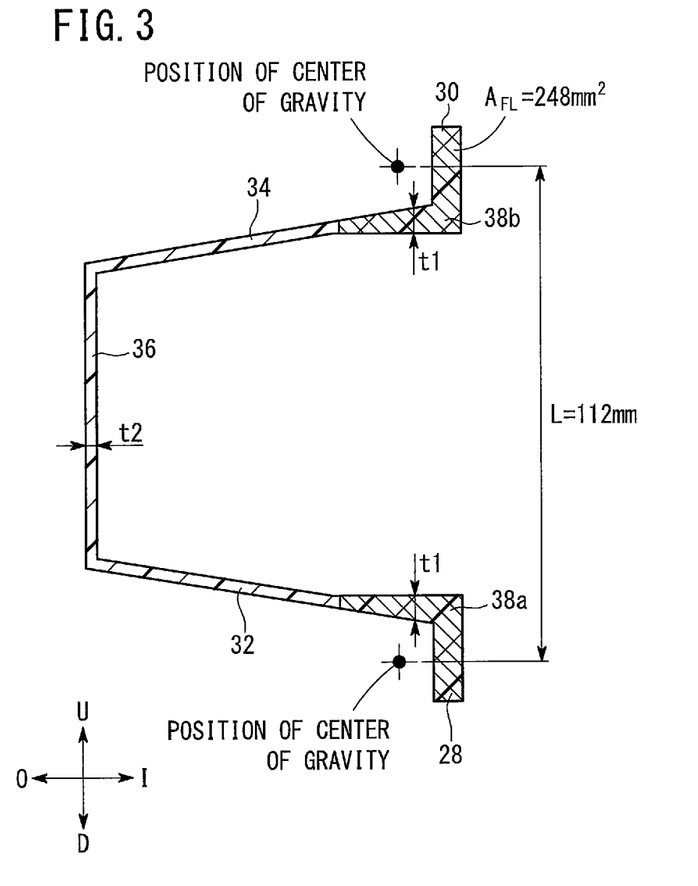
FIG. 3 is a vertical cross-sectional view showing a shape approximate to a side sill shown in FIG. 2.

The vertical cross-sectional shape of the side sill 20 shown in FIG. 2 can be generally approximated by a cross-sectional shape shown in FIG. 3. In this case, when a compressive load is applied to the side sill 20, a compressive stress acts on the upper side wall 34.

If the side sill 20 has a compressive strength of 200 MPa, then a buckling stress is equal to a smaller one of the compressive strength and Fccr' expressed by the following expression (1):

$$Fccr'=K\times\pi^2\times[E/\{12(1-n^2)\}]\times(t1/b)^2 \quad (1)$$

where K, π, E, n, t1, and b represent respectively the buckling coefficient, the circular constant, Young's modulus, Poisson's ratio, the thickness of the upper side wall 34, and the length of the upper side wall 34.

The side sill 20, whose approximate cross-sectional shape is shown in FIG. 3, bears a load applied thereto on four sides thereof, i.e., a side represented by the first vertical flange 28 and the second vertical flange 30, a side represented by the lower side wall 32, a side represented by the upper side wall 34, and a side represented by the bottom wall 36. Therefore, the load is received by the four sides. In this case, K=4.0.

If it is assumed that π=3.14, E=50 GPa, n=0.33, t1=3 mm, b=90 mm, then these values are substituted in the expression (1) to calculate Fccr', which is given as 205 MPa. Since the buckling stress is equal to a smaller one of the compressive strength and Fccr', the buckling stress is 200 MPa in this case.

An allowable bending moment $M_{ALLOW}$ is determined according to the following expression (2):

$$M_{ALLOW}=A_{FL}\times F\times L \quad (2)$$

where $A_{FL}$ denotes the total cross-sectional area of the thick wall portions 38a, 38b, F denotes an allowable stress, and L denotes the distance between the positions of center of gravity of the thick wall portions 38a, 38b.

Since F is equal to the buckling stress, 200 MPa is assigned to F. If $A_{FL}$=248 mm² and L=112 mm, then the allowable bending moment $M_{ALLOW}$ is calculated as 5.555 kN-m according to the expression (2).

Figure 4:
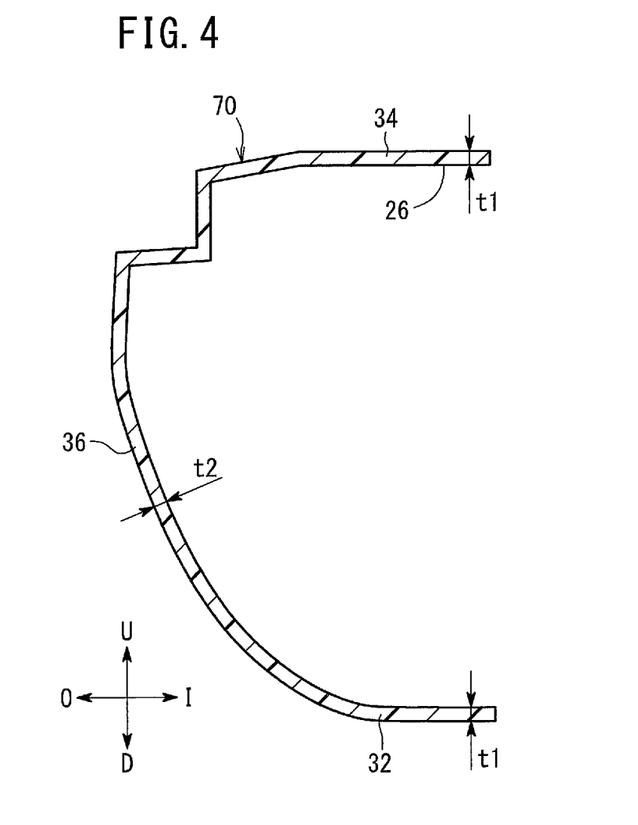
FIG. 4 is a vertical cross-sectional view of a side sill that is free of flanges in the vicinity of an opening and also free of thick wall portions in side walls.

FIG. 4 is a vertical cross-sectional view of a side sill 70 that is free of the first vertical flange 28 and the second vertical flange 30 and also free of the thick wall portions 38a, 38b. The cross-sectional shape of the side sill 70 is generally approximated by a cross-sectional shape shown in FIG. 5.

Figure 5:
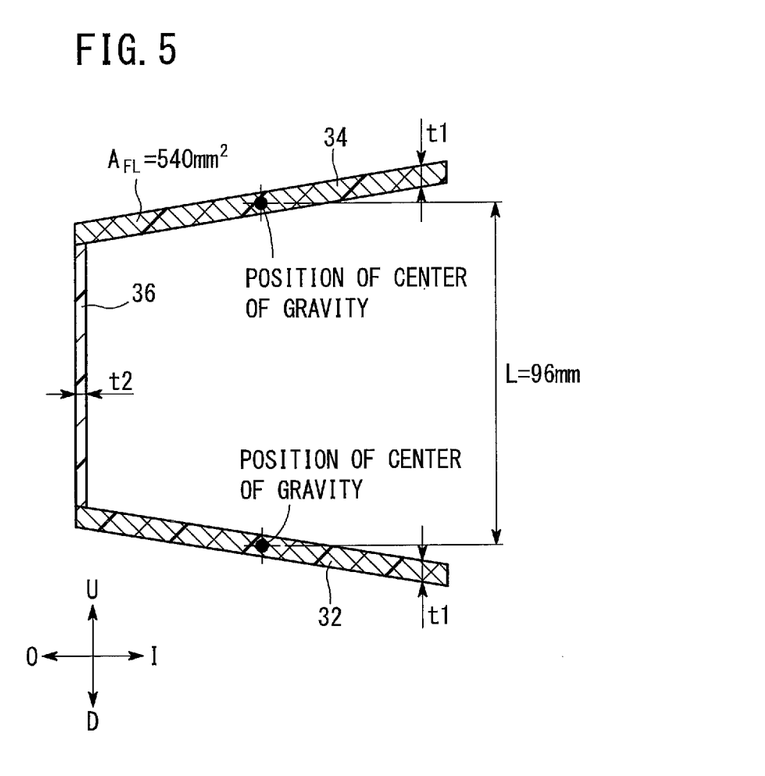
FIG. 5 is a vertical cross-sectional view showing a shape approximate to a side sill shown in FIG. 4.

The side sill 70 bears a load applied thereto on only three sides thereof, i.e., a side represented by the lower side wall 32, a side represented by the upper side wall 34, and a side represented by the bottom wall 36. Therefore, the load is received by the three sides. In this case, K=0.4.

The lower side wall 32 and the upper side wall 34 of the side sill 70 have a thickness t1. Even if the Young's modulus E and the Poisson's ratio n are of the same values as described above, and the thickness and length of the upper side wall 34 are set to t1=5.4 mm and b=100 mm, which are greater than the values described above, Fccr' calculated according to the expression (2) is given as 54 MPa. Since the buckling stress is equal to a smaller one of the compressive strength and Fccr', the buckling stress is 54 MPa even though the compressive strength is the same value of 200 MPa as described above.

If the total cross-sectional area of the lower side wall 32 and the upper side wall 34 and the distance between the positions of their centers of gravity are represented respectively by $A_{FL}$, L, and their values are 540 mm² and 96 mm, respectively, and 54 MPa is assigned to F in the expression (2), then the allowable bending moment $M_{ALLOW}$ is calculated as 2.799 kN-m according to the expression (2). The calculated allowable bending moment $M_{ALLOW}$ indicates that the bending strength of the side sill 70 that is shaped as shown in FIG. 4 (FIG. 5) is about one-half of the bending strength of the side sill 20 that is shaped as shown in FIG. 2 (FIG. 3). If the side sill 20 has a specific flexural rigidity of 1, then the side sill 70 has a specific flexural rigidity of 0.752.

As described above, the side sill 20 has the first vertical flange 28 and the second vertical flange 30 in the vicinity of the opening of the recess 26, and the proximal end portion (the thick wall portion 38a) of the lower side wall 32 that is joined to the first vertical flange 28 and the proximal end portion (the thick wall portion 38b) of the upper side wall 34 that is joined to the second vertical flange 30 are made thicker than the bottom wall 36. The side sill 20 thus constructed has a large buckling stress and a large allowable bending moment. When a compressive load is applied to the side sill 20, the side sill 20 is prevented from buckling.

The side sill member 12 has the boundary rib 48 in the boundary between the side sill 20 and the front fender 22 (see FIG. 1). When a compressive load is applied through a front upper member, tires, etc. to the pillar member 14 (A pillar post), a force acts on the bent region 24 between the side sill 20 and the front fender 22, tending to bend the bent region 24 in the rearward direction of the automotive body and deforming the lower side wall 32, the upper side wall 34, the first vertical flange 28, the second vertical flange 30, the front flange 40, and the rear flange 42. However, the boundary rib 48 is effective to prevent the lower side wall 32, the upper side wall 34, the first vertical flange 28, the second vertical flange 30, the front flange 40, and the rear flange 42 from being deformed, and to transmit the compressive load efficiently.

The pillar member 14, the rear fender member 16, and the roof rail member 18 are not liable to buckle even though they are not constructed like the side sill member 12. However, the pillar member 14, the rear fender member 16, and the roof rail member 18 are made more resistant to buckling if they are constructed in the same manner as the side sill member 12.

When a compressive load is applied to crush the automobile body along the transverse directions of the automotive body, then the ribs 58, 60 on the side sill member 12, the pillar member 14, the rear fender member 16, and the roof rail member 18 are effective to reduce the applied compressive load.

Figure 6A:
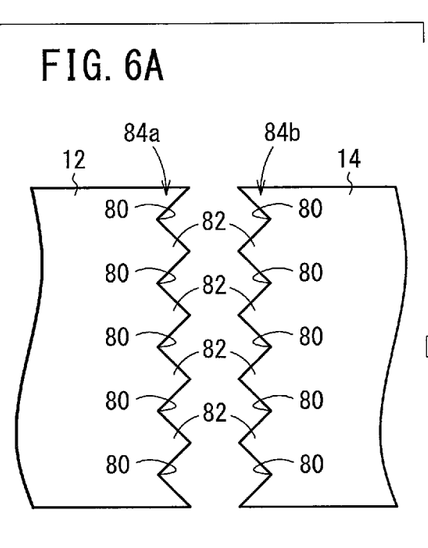
FIGS. 6A through 6C are plan views showing a sequence of joining a side sill member and a pillar member.

The side panel 10 may be fabricated as follows:

FIGS. 6A through 6C are enlarged fragmentary plan views showing a sequence of joining the side sill member 12 and the pillar member 14. As shown in FIG. 6A, the side sill member 12 and the pillar member 14 have wavy edges 84a, 84b, respectively, on joint regions thereof. Each of the wavy edges 84a, 84b comprises an alternate array of concave portions 80 and convex portions 82. The wavy edges 84a, 84b may be formed, for example, by cutting the joint regions of the side sill member 12 and the pillar member 14 or may be formed simultaneously when the side sill member 12 and the pillar member 14 are formed to shape. Although not shown, the rear fender member 16 and the roof rail member 18 may have joint regions including wavy edges similar to the wavy edges 84a, 84b.

The wavy edge 84a and the wavy edge 84b are in phase with each other. Each of the convex portions 82 projects in the form of a substantially isosceles triangle having a vertex angle of about 90°. The wavy edges 84a, 84b are thus tooth-shaped.

The end portions of the side sill member 12 and the pillar member 14 which include the wavy edges 84a, 84b are heated and pressed. The end portions may be heated and pressed simultaneously in one process or separately in two processes. In the following, separate processes of heating and pressing the end portions will be described.

First, the wavy edge 84a of the side sill member 12 and the wavy edge 84b of the pillar member 14 are individually placed in a heating apparatus, not shown. Then, a heating mechanism of the heating apparatus is energized to heat the wavy edges 84a, 84b. When heated, the wavy edges 84a, 84b are softened.

Figure 6B:
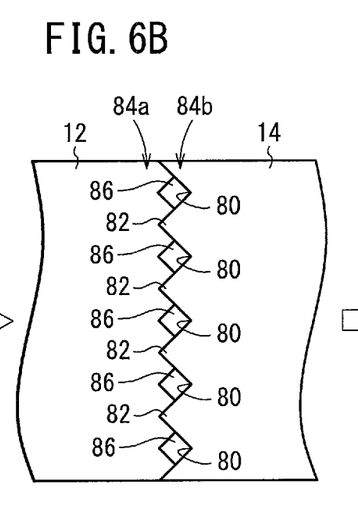

Next, the side sill member 12 and the pillar member 14 are transferred to a press. At this time, the side sill member 12 and the pillar member 14 are placed such that the convex portions 82 of the wavy edges 84a, 84b overlap each other, as shown in FIG. 6B. Accordingly, the concave portions 80 are positioned in confronting pairs, with non-overlapping spaces 86 left therebetween.

Figure 7:
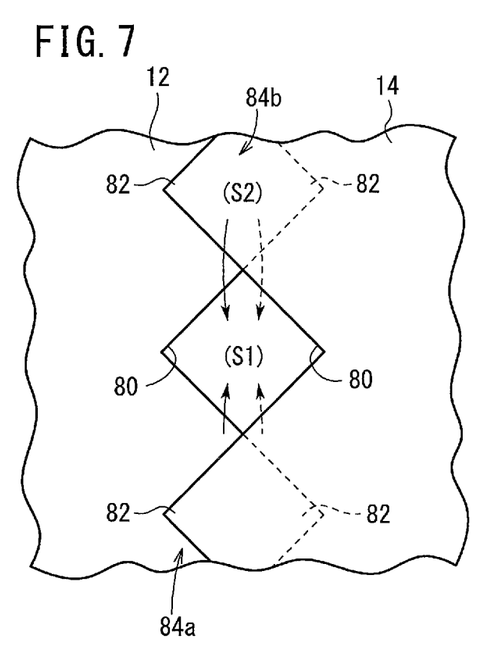
FIG. 7 is an enlarged fragmentary plan view of an overlapping region.

As shown at an enlarged scale in FIG. 7, each of the non-overlapping spaces 86 is substantially rhombic. According to the present embodiment, the convex portions 82 overlap each other such that the area S1 of the non-overlapping space 86 and the area S2 of an overlapping region of the paired convex portions 82 are equal to each other, i.e., S1/S2=1.

Figure 6C:
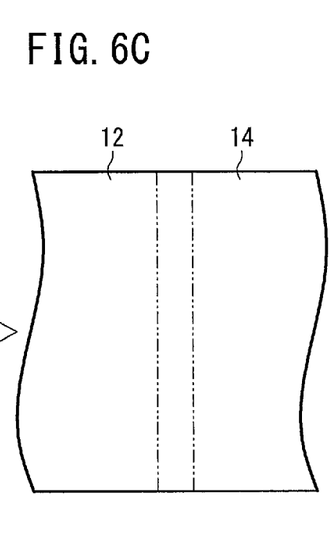

Then, the press is actuated to compress the overlapping wavy edges 84a, 84b. When compressed, the base material, i.e., the thermoplastic resin, of the overlapping convex portions 82 flows in the directions indicated by the arrows in FIG. 7. As a result, the non-overlapping spaces 86 are filled with the base material and the discontinuous fibers, and the unevenness formed due to the overlapping wavy edges 84a, 84b are eliminated (flatted). Thus, as shown in FIG. 6C, the wavy edges 84a, 84b and hence the side sill member 12 and the pillar member 14 are integrally joined together while the joined portion is formed into a flat joined region.

The flat joined region is then cooled and hardened, whereupon the side sill member 12 and the pillar member 14 are firmly joined to each other. The rear fender member 16 and the roof rail member 18 are similarly joined to each other. As a consequence, the side panel 10 is fabricated as a unitary panel.

The wavy edges 84a, 84b are illustrated as tooth-shaped edges. However, the wavy edges are not limited to tooth-shaped edges, but may be of a sinusoidal shape, for example.

The present invention is not limited to the illustrated details of the embodiment described above. It will be understood that variations and modifications can be effected thereto by those skilled in the art without departing from the scope of the invention as defined by the appended claims.

For example, the side panel 10 may originally be fabricated as a unitary panel including the side sill 20, the front fender 22, a pillar, a rear fender, and a roof rail.

The side sill member 12 may have two or more boundary ribs 48, or may have a substantially Y-shaped boundary rib 48.

What is claimed is:

1. A side panel for an automotive body, comprising:
a unitary panel having a side sill, a roof rail, and a pillar which are integrally joined to each other, the pillar extending from the side sill to the roof rail, each of the side sill, the roof rail, and the pillar being made of fiber-reinforced plastic;
wherein at least one of the side sill, the roof rail, and the pillar has a recess that is concave transversely along a transversely outward direction with respect to the automotive body, the recess defined by two side walls each bent from a unique one of two flanges and extending along the transversely outward direction with respect to the automotive body, and a bottom wall joined to the two side walls; and
each of the two side walls has a portion joined to the unique one of the two flanges, said portion of each of the two side walls being thicker than the bottom wall.

2. The side panel according to claim 1, wherein the side sill has the recess.

3. The side panel according to claim 2, further comprising:
a front fender bent from the side sill and contiguous to the side sill, the front fender has a front fender recess that is concave transversely along the transversely outward direction with respect to the automotive body, the front fender recess defined by two front fender side walls each bent from a unique one of two front fender flanges and extending along the transversely outward direction with respect to the automotive body, and a front fender bottom wall joined to the two front fender side walls, the recess of the side sill extending into and being continuous with the front fender recess; and
a rib disposed on a bent region between the bottom wall of the side sill and the front fender bottom wall, which is a boundary between the side sill and the front fender, the rib disposed on a side of the bent region facing the transversely inward direction with respect to the automotive body.

4. The side panel according to claim 3, wherein the side sill and the front fender are provided as a unitary member, the pillar being joined to the side sill, the roof rail being joined to the front fender and the pillar.

5. The side panel according to claim 3, wherein the two flanges of the side sill are each continuous with a unique one of the two front fender flanges, the two side walls of the side sill are each continuous with a unique one of the two front fender sidewalls, and the bottom wall of the side sill is continuous with the front fender bottom wall.

6. The side panel according to claim 5, wherein each of the two flanges of the side sill respectively extend in a vertical direction with respect to the vehicle body from the two side walls of the side sill, the vertical direction being perpendicular to the transversely outward direction, and each of the two front fender flanges respectively extend in a longitudinal direction with respect to the vehicle body from the two front fender side walls, the longitudinal direction being perpendicular to the transversely outward direction and the vertical direction.

7. The side panel according to claim 5, wherein the two flanges of the side sill are respectively bent substantially perpendicularly from the two side walls of the side sill, and the two front fender flanges are respectively bent substantially perpendicularly from the two front fender side walls.

8. The side panel according to claim 6, wherein the two flanges of the side sill are respectively bent substantially perpendicularly from the two side walls of the side sill, and the two front fender flanges are respectively bent substantially perpendicularly from the two front fender side walls.

9. The side panel according to claim 2, wherein the two flanges are respectively bent in a vertical direction with respect to the vehicle body from the two side walls, the vertical direction being perpendicular to the transversely outward direction.

10. The side panel according to claim 9, wherein the two flanges are respectively bent substantially perpendicularly from the two side walls.

11. The side panel according to claim 2, wherein the side sill has an open cross-sectional shape free of any members that cooperate with the two flanges, the two side walls, and the bottom wall to define a closed cross-sectional shape with the recess.

12. The side panel according to claim 1, wherein at least the side sill, the roof rail, and the pillar are provided as separate individual members, and the pillar is joined to the side sill and the roof rail to produce a unitary member.

13. The side panel according to claim 12, further comprising:
   a rear fender disposed between the side sill and the roof rail and joined to the side sill and the roof rail.

14. The side panel according to claim 1, wherein the unitary panel has an open cross-sectional shape free of any members that cooperate with the two flanges, the two side walls, and the bottom wall to define a closed cross-sectional shape with the recess.

15. The side panel according to claim 1, wherein the two flanges are respectively bent substantially perpendicularly from the two side walls.

\* \* \* \* \*